United States Patent
Tsuchiya

(10) Patent No.: US 11,037,704 B2
(45) Date of Patent: Jun. 15, 2021

(54) COMMUNICATION CABLE

(71) Applicant: TOSHIBA TEC KABUSHIKI KAISHA, Tokyo (JP)

(72) Inventor: Osamu Tsuchiya, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/814,556

(22) Filed: Mar. 10, 2020

(65) Prior Publication Data
US 2020/0388418 A1 Dec. 10, 2020

(30) Foreign Application Priority Data

Jun. 5, 2019 (JP) .............................. JP2019-105587

(51) Int. Cl.
*H02G 15/08* (2006.01)
*H01B 11/18* (2006.01)
*H01Q 13/20* (2006.01)
*H01R 9/05* (2006.01)
*H02G 15/02* (2006.01)
*H04W 88/08* (2009.01)

(52) U.S. Cl.
CPC ....... *H01B 11/1895* (2013.01); *H01Q 13/203* (2013.01); *H01R 9/0506* (2013.01); *H02G 15/025* (2013.01); *H04W 88/08* (2013.01)

(58) Field of Classification Search
CPC ..... H02G 15/08; H04B 5/0018; H01Q 13/203
See application file for complete search history.

(56) References Cited

U.S. PATENT DOCUMENTS

| 5,937,950 A * | 8/1999 | Adams ................. A61B 5/0428 174/72 R |
| 8,710,370 B2 * | 4/2014 | Heo ....................... H01R 31/06 174/72 R |
| 2013/0029600 A1 | 1/2013 | Mochizuki |

FOREIGN PATENT DOCUMENTS

| DE | 19503440 A1 | 8/1996 |
| EP | 0630070 A1 | 12/1994 |
| JP | 2018-117285 A | 7/2018 |

OTHER PUBLICATIONS

Extended European Search Report dated Sep. 22, 2020 in related European Application 20169312.4, 8 pages.

* cited by examiner

*Primary Examiner* — Chau N Nguyen
(74) *Attorney, Agent, or Firm* — Kim & Stewart LLP

(57) ABSTRACT

A communication cable includes a first leaky coaxial cable, a first leaky coaxial cable, and an approach cable. The first leaky coaxial cable has a first end and a second end connected to a communication device. The second leaky coaxial cable has a third end and a fourth end different from the first end and second end of the first leaky coaxial cable. The approach cable has a fifth end connected to the communication device and a sixth end connected to the third end of the second leaky coaxial cable, wherein the sixth end is positioned near the second end of the first leaky coaxial cable.

17 Claims, 3 Drawing Sheets

COMMUNICATION CABLE

CROSS-REFERENCE TO RELATED APPLICATIONS

This application is based upon and claims the benefit of priority from Japanese Patent Application No. 2019-105587, filed on Jun. 5, 2019, the entire contents of which are incorporated herein by reference.

FIELD

Embodiments of the present invention relate to a communication cable including an LCX cable (Leaky Coaxial Cable).

BACKGROUND

An LCX cable is a coaxial cable having a plurality of slots that are arranged at equal intervals in the longitudinal direction in the outer conductor layer. An LCX cable transmits and receives radio waves through the plurality of slots, and functions as a radio communication antenna for transmitting and receiving radio waves between various transmitters and receivers by radio communication.

An LCX cable may provide a communication area of a desired length along its longitudinal direction, and may be arranged flexibly to suit a particular purpose or use.

However, an LCX cable has a large degree of attenuation per unit length (hereinafter simply referred to as loss) of the signal transmitted through the cable, compared to a general coaxial cable having a substantially same diameter without slots. For example, the loss of an LCX cable at a frequency of 5.2 GHz used in a wireless LAN is about 1 dB/m for an LCX-5D cable. For this reason, for example, at the end of a 10 m LCX-5D cable, a loss of 10 dB (=10 m×1 dB/m) occurs. In contrast, the loss of a common coaxial cable of approximately the same diameter is approximately 0.5 dB/m. That is, the loss of the LCX cable is about 2 times that of a common coaxial cable having the same diameter. Therefore, in the LCX cable, the degree of reduction in the radiated radio wave intensity is increased depending on its length. As a result, in the LCX cable, the degree of reduction in the reception sensitivity of radio waves is increased, so that the performance as a radio communication antenna is reduced as compared to a non-LCX cable.

DETAILED DESCRIPTION

Embodiments provide a communication cable capable of suppressing deterioration in performance due to loss.

In general, according to one embodiment, a communication cable includes a first leaky coaxial cable, a second leaky coaxial cable, and an approach cable. The first leaky coaxial cable has a first end and a second end connected to a communication device. The second leaky coaxial cable has a third end and a fourth end different from first end of the second end of the first leaky coaxial cable. The approach cable has a fifth end connected to the communication device and a sixth end connected to the third end of the second leaky coaxial cable, wherein the sixth end is positioned near the second end of the first leaky coaxial cable.

Figure 1:
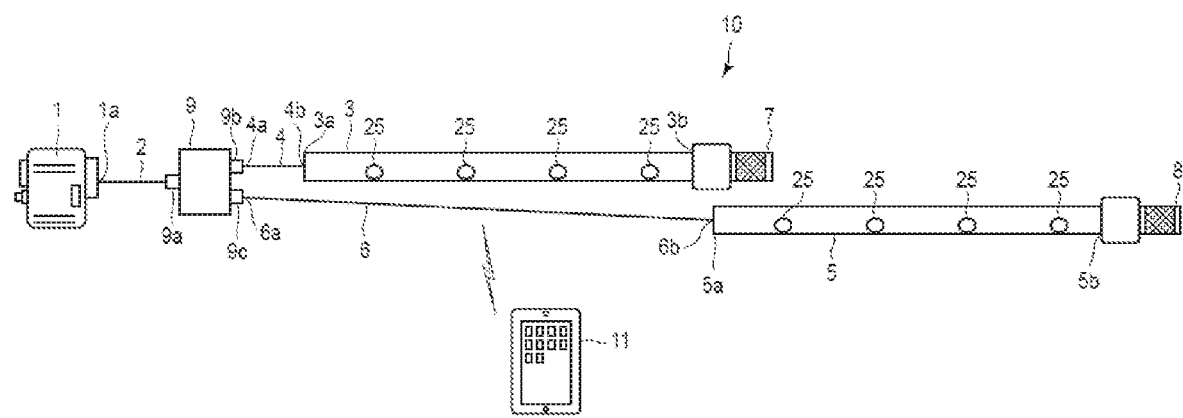
FIG. 1 is a schematic diagram illustrating a communication cable according to an embodiment.

Hereinafter, an embodiment will be described in detail with reference to the accompanying drawings. As shown in FIG. 1, a communication cable 10 according to the present embodiment is connected to an access point (AP) 1 which operates as a base station between communication devices (not shown). The communication cable 10 comprises three approach cables 2, 4 and 6, two LCX cables (Leaky Coaxial Cables) 3 and 5, two terminators 7 and 8, and a distributor 9. A connector (not shown) or the like is used as necessary for connection between the various cables 2-6 and the various devices 7-9.

The communication cable 10 transmits and receives radio waves between a device (not shown here) connected to a network such as an Internet, and a client terminal 11 such as a laptop PC or a PDA. That is, the communication cable 10 functions as a radio communication antenna for transmitting and receiving radio waves for communication.

The access point 1 modulates the transmission data to generate a high-frequency transmission signal, amplifies the generated transmission signal by an amplifier circuit (PA), and supplies the amplified transmission signal to the LCX cables 3 and 5. The access point 1 demodulates the received signal received via the LCX cables 3 and 5 to generate received data.

The access point 1 changes the target value of the signal to be amplified by the amplifier circuit described above, for example, by operating an operation unit provided in the access point 1 or in response to a command from an external device. That is, the access point 1 can adjust the transmission output (in particular, transmission power) of radio waves transmitted via the communication cable 10, and can adjust the communication area A (refer to FIG. 3) of the communication cable 10.

The distributor 9 of the communication cable 10 has a signal input terminal 9a and two signal output terminals 9b and 9c. The distributor 9 distributes the signal input through the signal input terminal 9a with the same signal strength, and outputs the signal through the signal output terminals 9b and 9c.

The signal output terminal 1a of the access point 1 and the signal input terminal 9a of the distributor 9 are connected to each other by an approach cable 2. One signal output terminal 9b of the distributor 9 and one end 3a of the signal input side of the LCX cable 3 are connected to each other by the approach cable 4. The other signal output terminal 9c of the distributor 9 and one end 5a of the signal input side of the LCX cable 5 are connected to each other by an approach cable 6.

In other words, one end 4a of the approach cable 4 is connected to the signal output terminal 9b of the distributor 9, and the other end 4b of the approach cable 4 is connected to the one end 3a of the LCX cable 3. One end 6a of the approach cable 6 is connected to the signal output terminal 9c of the distributor 9, and the other end 6b of the approach cable 6 is connected to the one end 5a of the LCX cable 5.

The terminators 7 and 8 are for preventing reflection of signals at the ends of the LCX cables 3 and 5, respectively. A terminator 7 is connected to the other end 3b of the LCX cable 3 opposite to the approach cable 4, and the terminator 7 is connected to the other end 5b of the LCX cable 5 opposite to the approach cable 6.

The two approach cables 2 and 4 may be relatively short and have a required minimum length, and may have substantially the same length in this embodiment.

In contrast, the approach cable 6 is longer than the approach cables 2 and 4, and is approximately the same length as the length of the approach cable 4 plus the LCX cable 3.

Therefore, when the communication cable 10 is extended in one direction (the left and right direction in the drawing) as shown in FIG. 1, the other end 6b of the approach cable 6 is positioned in the vicinity of the other end 3b of the LCX cable 3.

An optimal arrangement position of the other end 6b of the approach cable 6 will be described in detail later.

Figure 2:
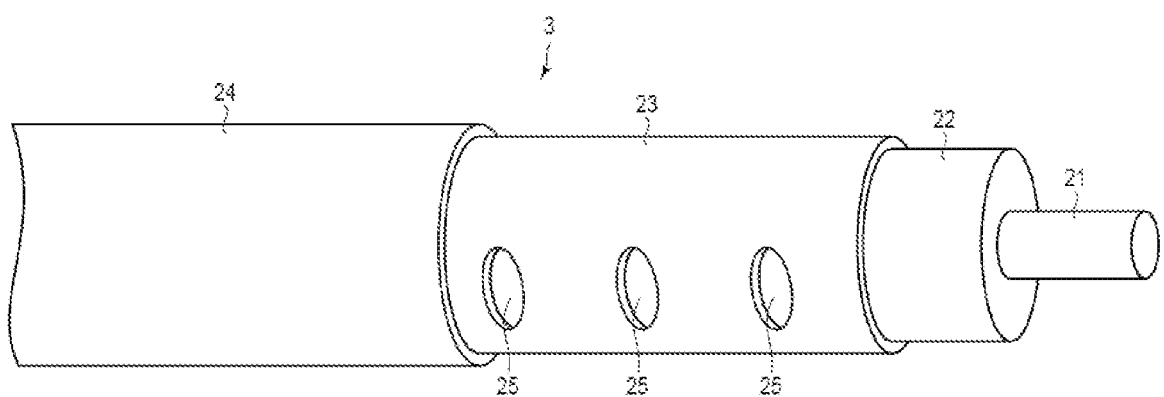
FIG. 2 is a partial enlarged view of an essential part of the LCX cable of the communication cable shown in FIG. 1.

As shown in FIG. 2, the LCX cable 3 includes a center conductor 21, an insulator 22, an outer conductor 23, and a sheath 24 concentrically positioned with respect to each other, respectively. The center conductor 21 is, for example, a copper wire having a circular cross section. The insulator 22 is made of, for example, a cylindrical polyethylene which covers the outside of the center conductor 21. The outer conductor 23 is formed of aluminum that is processed to cover the outside of the insulator 22, for example, into a pipe-like shape. The sheath 24 is formed of, for example, black polyethylene that covers the outer side of the outer conductor 23.

The LCX cable 5 has the same structure as that of the LCX cable 3. In the present embodiment, the LCX cable 3 and the LCX cable 5 are made to have the same length. By making the LCX cable 3 and the LCX cable 5 to have the same length, the communication performance can be made substantially the same. Here, the LCX cable 3 will be described, and the description of the LCX cable 5 will not be repeated for sake of brevity.

The outer conductor 23 of the LCX cable 3 has a plurality of slots 25 of a predetermined shape. In the present embodiment, a plurality of slots 25 are formed in an elliptical shape having substantially the same size. The plurality of slots 25 are provided at equal pitches along the center axis of the external conductor 23 (i.e., the center axis of the LCX cable 3), and the minor axis of the elliptical shape is arranged in a straight line in the longitudinal direction of the external conductor 23. The shape of the slots 25 is not limited to this, and may be any shape such as a circular shape.

The plurality of slots 25 may also be provided on diametrically opposite sides that are not visible in FIG. 2. The plurality of slots 25 in the outer conductor 23 are covered by the sheath 24 and are not visible from the outside. In FIG. 1, for clarity of description, the slots 25 are illustrated that is not visible due to the sheaths 24 covering them. In the drawings, the size, shape and number of the slots 25 are different from those of the actual ones, and the description thereof will be easily understood.

The plurality of slots 25 are open holes in which the interval (pitch along the longitudinal direction of the cable) is determined in accordance with the wavelength of radio waves used in the communication cable 10 according to the present embodiment. When the signal is transmitted through the LCX cable 3, radio waves escape from (i.e., leak out of) each slot 25. Alternatively, a radio wave is received through each slot 25. That is, by transmitting/receiving radio waves through the plurality of slots 25, the LCX cable 3 functions as a radio communication antenna.

The LCX cable 3 forms a communication area A (see FIG. 3) in a range that is substantially the same distance from the center line of the cable in the radial direction over substantially the entire length in the longitudinal direction. In other words, the uniform communication area A in the longitudinal direction of the LCX cable 3 can be formed by forming the LCX cable 3 to a predetermined length while keeping the pitch of the plurality of slots 25 constant. Here, the predetermined length is the length allowed by the loss in the LCX cable 3 as the communication cable 10.

Figure 3:
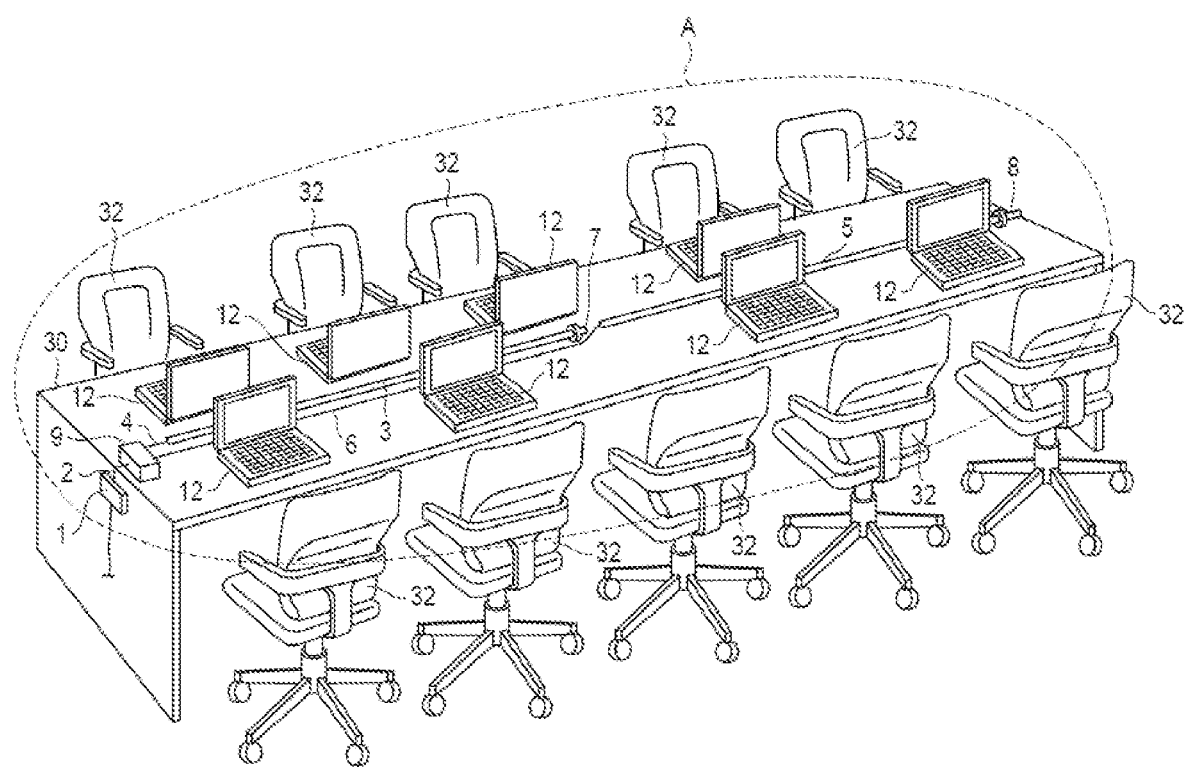
FIG. 3 is a schematic diagram illustrating an example of the use of the communication cable of FIG. 1.

As shown in FIG. 3, the communication cable 10 according to the present embodiment can be used by being placed in the center of a large table or a plurality of desks (so-called "islands") installed in a conference room of an office, for example.

In the case shown in FIG. 3, the communication cable 10 is arranged on a center line along the longitudinal direction of the large table 30.

The access point 1 and the distributor 9 are installed at the longitudinal end portion of the large table 30.

The terminator 8 of the LCX cable 5 is located at the opposite end of the large table 30.

Then, the communication area A of the communication cable 10 is adjusted to a size that covers the entire large table 30. For example, the communication area A is adjusted to be roughly a cylindrical area that has a center axis which coincides with the communication cable 10 and a radius of about 1-2 m.

By setting the communication cable 10 and adjusting the communication area A as described above, for example, it becomes possible to perform an Internet connection of the laptop type PCs 12 placed on the large table 30 and the client terminal 11 (see FIG. 1), such as a tablet terminal (not shown), which is operated by a person sitting on the chair 32.

The LCX cables 3 and 5 have a loss per unit length of about 2 times as compared to a general coaxial cable having a substantially same diameter without the slots 25.

Therefore, when the LCX cables 3 and 5 are not divided as in the present embodiment and one LCX cable is used, loss occurs near the end of the one LCX cable (which corresponds to the LCX cables 3 and 5 being connected to each other). In addition, when the total length of the cable exceeds a certain length, performance as a communication cable becomes insufficient, and quality of communication is deteriorated.

Therefore, in the present embodiment, the lengths of the LCX cables 3 and 5 are limited to a length with a permissible loss, and the number (two cables in this embodiment) of LCX cables 3 and 5 that correspond to the length of the desired communication area A are arranged in a predetermined direction (longitudinal direction of the desired communication area A). Then, each of the LCX cables 3 and 5 and the distributor 9 are connected to each other by respective individual approach cables 4 and 6. That is, the same number of approach cables as the number of LCX cables are used.

Thus, performance degradation of the communication cable 10 due to loss can be suppressed, and communication quality of communication can be secured.

In this case, although the loss in the approach cables 2, 4 and 6 is also generated, the approach cables 2, 4 and 6 are a common coaxial cable without having the slots 25, so that the loss is about ½ of the LCX cables 3 and 5 when the diameters are the same. Therefore, even if the approach cable 6 is made somewhat longer, it does not become a source of unacceptable loss such as to decrease in communication quality. Alternatively, approach cable 4 may be slightly longer than shown to approximate the loss of approach cable 6. In this case, the approach cable 4 is slightly bent, end portions of the LCX cables 3 and 5 are arranged adjacent to each other, and the LCX cables 3 and 5 are arranged in series with respect to each other.

It is also important that the communication area A of the communication cable 10 is uniform in the longitudinal direction in order to ensure the quality of communication.

For example, in the communication cable 10 of the present embodiment, when the distance between the end portion of the LCX cable 3 on the terminator 7 side and the end portion on the approach cable 6 side of the LCX cable 5 is separated to some extent, the communication area A as the communication cable 10 becomes narrower than the other portion in the separated portion.

Therefore, the distance between the end portions of the LCX cables 3 and 5 facing each other is preferably set to a suitable distance.

As described above, the LCX cables 3 and 5 have the plurality of slots 25 formed thereon with a uniform pitch, thereby making the communication area A uniform along the longitudinal direction. Even when two LCX cables 3 and 5 are arranged in series as in the present embodiment, the entire length of the communication cable 10 can be made uniform by employing the same pitch for all the slots 25 arranged in a row. That is, when two LCX cables 3 and 5 are arranged in series in the longitudinal direction, two LCX cables 3 and 5 may be arranged close to each other so that a distance between a slot on the LCX cable 5 side of the LCX cable 3 and a slot on the LCX cable 3 side closest to the LCX cable 5 is substantially equal to a pitch of the plurality of slots 25 in the LCX cables 3 and 5.

Therefore, in this embodiment, the other end 6b on the LCX cable 5 side of the approach cable 6 connecting the LCX cable 5 to the distributor 9 is disposed in the vicinity of the other end 3b of the LCX cable 3. "Vicinity" means a positional relationship in which all of the slots 25 of the communication cable 10 are arranged at substantially the same pitch when two LCX cables 3 and 5 are arranged in a straight line in a predetermined direction as described above. For this reason, for example, in the example shown in FIG. 1, the other end 6b of the approach cable 6 is located at a position substantially overlapping with the terminator 7 of the LCX cable 3 such that a line that passes through a slot 25 of the LCX cable 3 adjacent to the end 3b of the LCX cable 3 and perpendicular with respect to the longitudinal direction does not intersect the LCX cable 5.

It should be noted that the other end 3b of the LCX cable 3 may be closer to the one end 5a of the LCX cable 5, and the other end 3b of the LCX cable 3 and the one end 5a of the LCX cable 5 may overlap each other such that a combined length of the approach cable 4 and the LCX cable 3 is approximately equal to the length of the approach cable 6.

In this case, a region in which the communication area A is narrowed does not occur, but the entire length of the communication cable 10 is shortened, so that the material cost is increased.

Therefore, it is preferable that the positional relationship between the other end 3b of the LCX cable 3 and the one end 5a of the LCX cable 5 is such that the pitch of all the slots 25 of the communication cable 10 is substantially the same.

According to the embodiment described above, two LCX cables 3 and 5 are arranged in a straight line, and in the vicinity of the other end 3b of the LCX cable 3 separated from the distributor 9, the other end 6b on the LCX cable 5 side of the approach cable 6 for connecting the LCX cable 5 to the distributor 9 is arranged. Therefore, it is possible to suppress deterioration in performance of the communication cable 10 due to loss.

The embodiments described above are presented by way of example only and are not intended to limit the scope of the invention. The embodiments described above can be implemented in various other forms, and various omissions, substitutions and changes can be made without departing from the spirit and scope of the invention. The above embodiments and variations thereof are included within the scope and spirit of the invention as well as the scope and spirit of the invention.

For example, although the communication cable 10 in which two LCX cables 3 and 5 are linearly arranged has been described in the above embodiment, the present invention is not limited thereto, and three or more LCX cables may be connected to the distributor by the same number of the approach cables.

In this case, the length of the plurality of approach cables may be changed stepwise.

In the embodiment described above, the approach cables 2, 4 and 6 having a loss of about ½ of the LCX cables 3 and 5 are used, but the present invention is not limited thereto. An approach cable may be used that is at least less lossy per unit length than the LCX cable.

The communication cable 10 described above may be disposed in a groove or trough provided in the center of the large table 30, and the approach cables 4 and 6 and the LCX cables 3 and 5 may be covered as one cable to form an integrated structure.

Alternatively, the communication cable 10 may be accommodated in a case having insulation properties or the like, and used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication cable comprising:
   a first leaky coaxial cable arranged to extend in a first direction and having opposing first and second ends in the first direction, the second end being connected to a communication device;
   a second leaky coaxial cable having opposing third and fourth ends;
   a first approach cable arranged to extend in the first direction substantially parallel to the first leaky coaxial cable and offset from the first leaky coaxial cable in a second direction perpendicular to the first direction, the first approach cable having opposing fifth and sixth ends in the first direction; and
   a second approach cable having a seventh end connected to the communication device and an eighth end connected to the second end of the first leaky coaxial cable,
   wherein the fifth end of the first approach cable is connected to the communication device and the sixth end of the first approach cable is connected to the third end of the second leaky coaxial cable at a location near the first end of the first leaky coaxial cable, and
   wherein a line that passes through a slot of the first leaky coaxial cable adjacent to the first end of the first leaky coaxial cable and perpendicular with respect to the first direction does not intersect the second leaky coaxial cable, and a length of the first approach cable is approximately equal to a combined length of the second approach cable and the first leaky coaxial cable.

2. The communication cable according to claim 1, wherein
the first leaky coaxial cable and the second leaky coaxial cable are approximately of the same length.

3. The communication cable according to claim 1, wherein
both the first leaky coaxial cable and the second leaky coaxial cable extend in the first direction.

4. The communication cable according to claim 1, further comprising:
a distributor connected to the communication device, wherein
the seventh end of the second approach cable and the fifth end of the first approach cable are connected to the distributor.

5. The communication cable according to claim 4, further comprising a third approach cable connecting the distributor to the communication device.

6. The communication cable according to claim 4, wherein the communication device comprises a network access point.

7. The communication cable according to claim 4, wherein the distributor includes a first output port connected to the seventh end of the second approach cable, a second output port connected to the fifth end of the first approach cable, and an input port connected to the communication device.

8. The communication cable according to claim 1, wherein a length of the second approach cable is less than the length of the first approach cable.

9. The communication cable according to claim 1, wherein the length of the first approach cable is longer than a length of the first leaky coaxial cable.

10. A communication system comprising:
a first leaky coaxial cable arranged to extend in a predetermined direction and having opposing first and second ends in the predetermined direction, the second end being connected to a communication device;
a second leaky coaxial cable having opposing third and fourth ends;
a first approach cable having opposing fifth and sixth ends, the fifth end connected to the communication device and the sixth end connected to the third end of the second leaky coaxial cable; and
a second approach cable having opposing seventh and eighth ends, the seventh end connected to the communication device and the eighth end connected to the second end of the first leaky coaxial cable,
wherein the sixth end of the first approach cable is connected to the third end of the second leaky coaxial cable at a location near the first end of the first leaky coaxial cable, and
wherein a line that passes through a slot of the first leaky coaxial cable adjacent to the first end of the first leaky coaxial cable with respect to the predetermined direction does not intersect the second leaky coaxial cable, and a length of the first approach cable is approximately equal to a combined length of the second approach cable and the first leaky coaxial cable.

11. The communication system according to claim 10, further comprising:
a distributor having an input port connected to the communication device, a first output port connected to the first approach cable, and a second output port connected to the second approach cable.

12. The communication system according to claim 11, further comprising:
a third approach cable having opposing ninth and tenth ends, the ninth end connected to the distributor and the tenth end connected to the communication device.

13. The communication system according to claim 12, wherein the first leaky coaxial cable, the second leaky coaxial cable, the first approach cable, the second approach cable, and the third approach cable each extend in the predetermined direction that is parallel to a longitudinal axis of the first leaky coaxial cable, the second leaky coaxial cable, the first approach cable, the second approach cable, and the third approach cable.

14. The communication system according to claim 10, wherein the communication device comprises a network access point.

15. The communication system according to claim 10, wherein the first leaky coaxial cable and the second leaky coaxial cable are approximately the same length.

16. The communication system according to claim 10, wherein both the first leaky coaxial cable and the second leaky coaxial cable extend in the predetermined direction.

17. The communication system according to claim 10, wherein the length of the first approach cable is greater than a length of the first leaky coaxial cable.

* * * * *